UNITED STATES PATENT OFFICE.

FRIEDRICH GRAF DE LA ROSÉE, OF GARMISCH-PARTENKIRCHEN, GERMANY, ASSIGNOR, BY MESNE ASSIGNMENTS, TO THE CHEMICAL FOUNDATION, INC., A CORPORATION OF DELAWARE.

PROCESS OF MANUFACTURING CAOUTCHOUC-LIKE SUBSTANCES.

1,399,473.    Specification of Letters Patent.    Patented Dec. 6, 1921.

No Drawing.    Application filed January 8, 1919. Serial No. 270,243.

*To all whom it may concern:*

Be it known that I, FRIEDRICH GRAF DE LA ROSÉE, a subject of the German Emperor, and resident of Garmisch-Partenkirchen, Bavaria, Germany, have invented a new and Improved Process of Manufacturing Caoutchouc-Like Substances, of which the following is a specification.

The process is carried out as follows:

Resins, chiefly balsamic resins and scrap resins are melted with chlorid of calcium in a closed boiler at a temperature of about 160° to 200° C. and are kept in this state for about two hours, after which the mass is filtered in order to free it from all impurities.

The thus obtained mass is then subjected to a first distillation process and during this time about 10% of chlorid of lime and about $2\frac{1}{2}$% of chlorid of calcium are added. During the slow heating to 160–180° C. a first running passes off, and during the further slow heating to a temperature above 180° C. a second running, both in the form of a badly-smelling resin spirit. The temperature is then further slowly raised to about 340° C. when resin oils will commence to pass over, and this temperature is uniformly maintained as long as liquid oily substances are passing over; the distillation phase is nearly finished when the operator perceives that the oils are becoming thick.

With the first two runnings a large part of the terpenes that were contained within the resins have passed over, as has also a large part of other ethereal substances. The residue, however, that forms, after its solidification, a hard, pitch-like body, contains the tars and the pitch-like substances. The oils appear now completely free of water.

The oils are immediately subjected to a second distillation process, together with a small quantity of chlorid of lime, for example about 4 to 6% of the weight of the oils. During the second distillation which is carried through exactly as the first only one running passes over, and the residue is not hard and brittle, but forms a thick, lubricant-like product. After the second distillation the oils show by their smell that neither terpenes, nor any ethereal substances are contained within them.

Owing to the treatment with chlorin, a certain change has taken place within the oil, and as a consequence thereof it has become well adapted for treatment with sulfur and for taking up india-rubber.

The oils are subjected a third time to a distillation process, with an addition of chlorid of lime, in order to convert them into a chloro-resin oil. The quantity of the chlorid of lime amounts in this case to from 10% to 40% of the weight of the oil and depends upon the desired content of chlorin in the oil.

For instance, about $\frac{1}{4}$ of revivified india-rubber in small pieces and $\frac{3}{4}$ of chloro-resin oil (or $\frac{1}{12}$ of the india-rubber and $\frac{11}{12}$ of the oil) are mixed. If revivified india-rubber is employed, the tarry or decomposed india-rubber particles that have remained from the revivification process and form noxious components of the revivified india-rubber are removed by placing this latter in a suitable solvent, for instance ether, or methyl- or ethyl-alcohol. Within 12–24 hours the revivified india-rubber particles which contain but little oil have completely taken up the chloro-resin oil and form a thick, pulpy mass. To this mass is added resin oil from the second distillation which had been treated with sulfur and lime, and the product thus obtained is subjected to the known vulcanizing process, that is to say, to the known binding process, by which the oils are converted into caoutchouc. The mass may now be worked either with revivified india-rubber in order to eke it out, or, immediately with india-rubber.

Also synthetic india-rubber or caoutchouc or similar synthetic products may be treated according to the invention, in which case it is only necessary to let the synthetic caoutchouc take up the oils, after which this mass together with the caoutchouc product formed by vulcanization of the chloro-resin oils with the revivified india-rubber may be directly rolled. There is obtained in this way a product equalling the best india-rubber and which may be vulcanized and worked exactly like Para-rubber and the like.

I claim as my invention.

1. The process of manufacturing caoutchouc-like substances, consisting in melting resins with an addition of chlorid of calcium, subjecting the molten mixture to a repeated distillation process with further addition of chlorid of calcium in connection with chlorid of lime, mixing the thereby obtained oils with india-rubber, and subjecting this mixture to the usual vulcanizing process, substantially as described.

2. The process of manufacturing caoutchouc-like substances, consisting in melting balsamic and scrap-resins with an addition of chlorid of calcium, subjecting the molten mixture to a repeated distillation process with further addition of chlorid of calcium in connection with chlorid of lime, mixing the thereby obtained oils with india-rubber, and subjecting this mixture to the usual vulcanizing process, substantially as described.

3. The process of manufacturing caoutchouc-like substances, consisting in melting resins with an addition of chlorid of calcium, subjecting the molten mixture to a repeated distillation process with further addition of chlorid of calcium in connection with chlorid of lime; freeing revivified india-rubber from factis, tar, and other residues; mixing the oils obtained by said repeated distillation process with said india-rubber, and subjecting this mixture to the usual vulcanizing process, substantially as described.

4. The process of manufacturing caoutchouc-like substances, consisting in melting resins with an addition of chlorid of calcium, subjecting the molten mixture to a distillation process with further addition of chlorid of calcium in connection with chlorid of lime, mixing the thereby obtained oils with india-rubber, and subjecting this mixture to the usual vulcanizing process, substantially as described.

In witness whereof I have hereunto set my hand.

FRIEDRICH GRAF de la ROSÉE.